United States Patent
Liu et al.

(10) Patent No.: US 9,112,825 B2
(45) Date of Patent: Aug. 18, 2015

(54) PERFORMANCE MONITORING OF A MEDIA PLAYER LAUNCHED BY A WEB BROWSER

(75) Inventors: Yuejiang Liu, Beijing (CN); Cheng Tang, Beijing (CN); Xudong Zhang, Lexington, MA (US); Jia Xie, Beijing (CN); Xiaoqiang Li, Beijing (CN)

(73) Assignee: Dynatrace LLC, Detroit, MI (US)

( * ) Notice: Subject to any disclaimer, the term of this patent is extended or adjusted under 35 U.S.C. 154(b) by 154 days.

(21) Appl. No.: 13/319,913

(22) PCT Filed: Sep. 7, 2011

(86) PCT No.: PCT/CN2011/001515
§ 371 (c)(1),
(2), (4) Date: Jul. 31, 2012

(87) PCT Pub. No.: WO2013/033863
PCT Pub. Date: Mar. 14, 2013

(65) Prior Publication Data
US 2013/0061129 A1   Mar. 7, 2013

(51) Int. Cl.
G06F 11/30 (2006.01)
H04L 29/08 (2006.01)
H04N 21/442 (2011.01)
H04N 21/4782 (2011.01)
H04N 21/8543 (2011.01)

(52) U.S. Cl.
CPC ............... *H04L 67/02* (2013.01); *G06F 11/30* (2013.01); *H04L 67/22* (2013.01); *H04N 21/44231* (2013.01); *H04N 21/4782* (2013.01); *H04N 21/8543* (2013.01)

(58) Field of Classification Search
CPC ....................................................... G06F 11/30
USPC ........................................................... 715/234
See application file for complete search history.

(56) References Cited

U.S. PATENT DOCUMENTS

| | | | | |
|---|---|---|---|---|
| 5,838,906 A | * | 11/1998 | Doyle et al. | 715/205 |
| 7,765,295 B2 | | 7/2010 | Anastas et al. | |
| 8,122,122 B1 | * | 2/2012 | Clingenpeel et al. | 709/224 |
| 2002/0010621 A1 | * | 1/2002 | Bell et al. | 705/10 |
| 2004/0136327 A1 | * | 7/2004 | Sitaraman et al. | 370/252 |
| 2006/0085420 A1 | * | 4/2006 | Hwang | 707/10 |
| 2006/0136578 A1 | | 6/2006 | Covell et al. | |

(Continued)

FOREIGN PATENT DOCUMENTS

| CN | 1437124 | 8/2003 |
|---|---|---|
| CN | 101282348 | 10/2008 |

(Continued)

*Primary Examiner* — Kavita Padmanabhan
*Assistant Examiner* — Tionna Burke
(74) *Attorney, Agent, or Firm* — Harness, Dickey & Pierce, P.L.C.

(57) ABSTRACT

A computer-implemented system is provided for monitoring performance of a media player launched by a web browser. The media player is referenced by a document that defines a web page and is implemented as a plug-in to the web browser. Upon accessing the web page, the web browser launches the media player. The media player in turn launches a performance monitor that is implemented as a plug-in to the media player. The performance monitor subscribes to event listener objects exposed by the media player and receives event data that is reported by the event listener objects. Performance metrics pertaining to the media player are derived from the event data.

16 Claims, 7 Drawing Sheets

(56) References Cited

U.S. PATENT DOCUMENTS

2006/0136927 A1 6/2006 Covell et al.
2007/0271590 A1 11/2007 Gulas et al.

FOREIGN PATENT DOCUMENTS

| CN | 101478669 | 7/2009 |
| CN | 101848367 | 9/2010 |

* cited by examiner

PERFORMANCE MONITORING OF A MEDIA PLAYER LAUNCHED BY A WEB BROWSER

FIELD

The present disclosure relates to real time performance monitoring of media players launched by web browsers.

BACKGROUND

Web site owners need to know which users are having trouble interacting with their web site and specifically what those problems are. For example, web site owners need to know if the problems are isolated in a certain geographical area, if the problems are tied to a specific operating system, etc. Failure to diagnose and correct the problems that user's encounter on a web site ultimately impact a user's ability, for example, to do business with a web site.

Performance monitoring tools for web sites are commercially available in the marketplace. With the prevalence of client-side scripting in web page development, it has become significantly more difficult to properly diagnose problems experienced by users. In particular, streaming content providers are unable to track performance experienced by users of media players embedded into web browsers. While synthetic performance monitoring solutions have been proposed, there remains a need for real time performance monitoring of media players launched by web browsers.

This section provides background information related to the present disclosure which is not necessarily prior art.

SUMMARY

A computer-implemented system is provided for real-time monitoring performance of a media player launched by a web browser. The media player is referenced by a document that defines a web page and is implemented as a plug-in to the web browser. Upon accessing the web page, the web browser launches the media player. The media player in turn launches a performance monitor that is implemented as a plug-in to the media player.

The performance monitor operates to subscribe to event listener objects exposed by the media player and receives event data that is reported by the event listener objects. Performance metrics pertaining to the media player are derived from the event data. In some embodiments, event data is stored in a queue and sent periodically over a data network by the performance monitor to a server. Performance metrics for the media player are then determined from the event data at the server. In other embodiments, performance metrics are determined by the performance monitor before being communicated to the remote server.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 1:
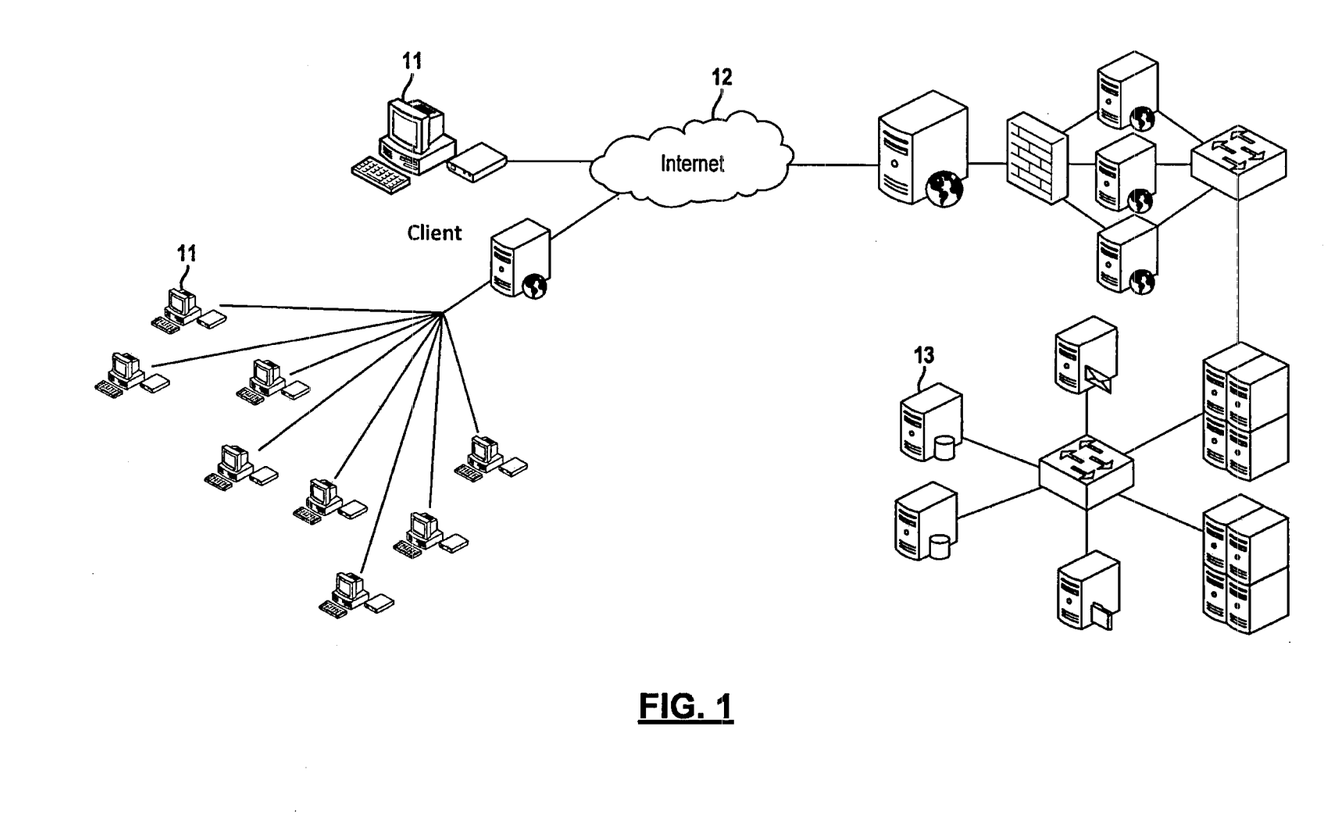
FIG. 1 is a diagram of an exemplary computer network system.

FIG. 1 illustrates an exemplary computer network system 10. The computer network system 10 may be comprised of one or more client computing devices 11 interconnected via a computer network 12 to one or more server computers 13. One popular use of such computer systems is to retrieve and view web pages on the World Wide Web. Web browsers are used to retrieve web pages and associated content. In response to requests for web pages made by web browsers, web servers obtain the requested web pages and serve those pages back to the web browser for viewing by a user. Web browsers typically reside on client computing devices 11; whereas, web servers are typically hosted by the server computers 13. Server computers 13 (either the same or different from those hosting web servers) are also used to host backend processing for performance monitoring tools as will be further described below. Although the client computing devices 11 are illustrated as desktop computers in FIG. 1, it is readily understood that this term more broadly encompasses other types of computing devices, including phones, tablets, cameras, laptops, etc.

Figure 2:
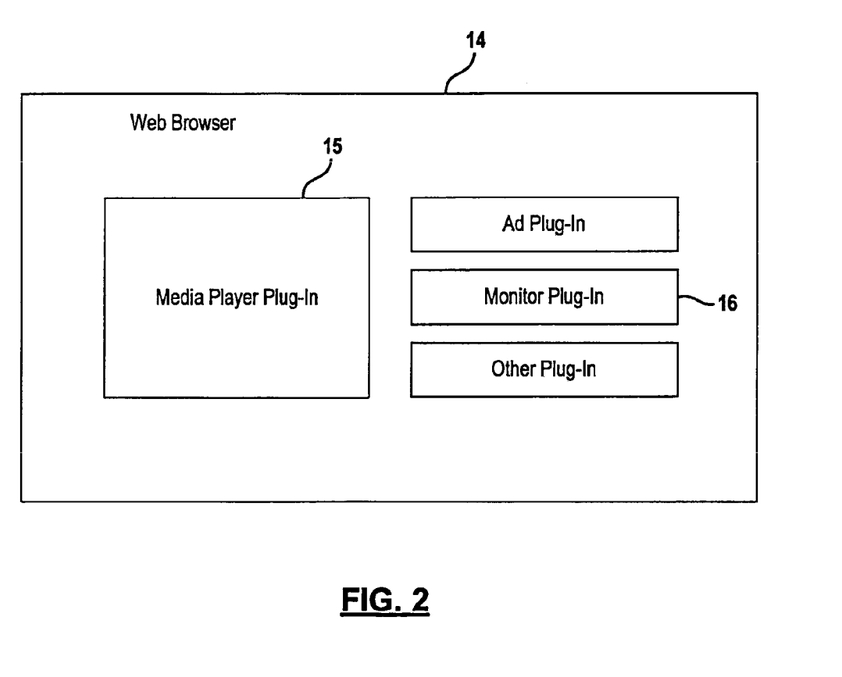
FIG. 2 is a diagram of an exemplary framework for integrating a performance monitor into a web browser.

FIG. 2 provides an exemplary framework for monitoring performance of a media player 15 launched by a web browser 14. Media players are known software components for playing multimedia files, such as streaming video. Exemplary media players may include (but are not limited to) Adobe's Flash player and Microsoft's Silverlight player. Web pages often rely upon media players to enhance content delivery. In a typical scenario, the media player 15 is launched as a plug-in to the web browser 14. Reference to the media player is made via a link to the media player contained in the HTML document that defines a given web page.

Likewise, the media player 15 itself may support plug-ins, such that a performance monitor 16 may be launched by the media player. The performance monitor 16 is a software component executed in the client computing environment to monitor the performance of the media player 15 in a manner further described below. In exemplary embodiment, the performance monitor 16 may be implemented as a client-side script written in JavaScript, ActionScript, or other similar scripting languages. Thus, execution of both the media player 15 and the performance monitor 16 occurs in the computing environment of the client computer hosting web browser 14. Other techniques for dynamically initiating the performance monitor 16 by the media player 15 are also contemplated by this disclosure.

Figure 3:
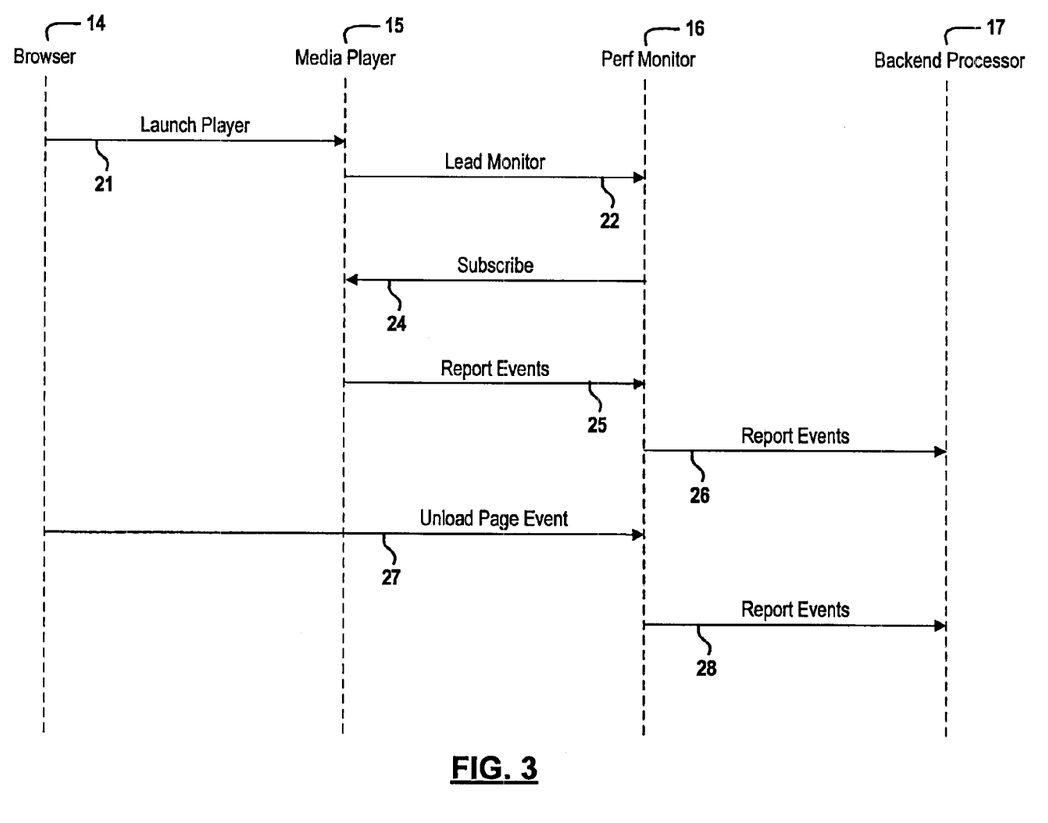
FIG. 3 is a sequence diagram illustrating a method for monitoring performance of a media player launched as a plug-in to a web brows.

With reference to FIG. 3, the web browser 14 will operate at 21 to launch the media player 15. More specifically, the web browser will launch the media player upon rendering of a web page that makes reference to the media player 15. The media player 15 will in turn load the performance monitor as indicated at 22. In an exemplary embodiment, the media player 15 itself supports plug-ins such that the performance monitor may be implemented as a plug-in to the media player. Accordingly, the HTML document would contain a reference to the performance monitor. More specifically, the tag for the media player in the HTML document includes a URL for the performance monitor. The media player uses the URL to launch the performance monitor. Sample code for an exemplary HTML document modified in this manner is set forth below.

```
<embed height="450" width="540" align="middle" type="application/x-
shockwave-flash" flashvars="
plugins=http://img1.c0.=letv.com/ptv/player/plugins/zoomBar.swf,
http://gomez.customer_a.com/perfmonitorplugin.swf,
http://img1.c0.letv.com/ptv/player/plugins/lerecommend.swf,
http://img1.c0.letv.com/ptv/player/plugins/displayBar.swf
```

While reference is made to hypertext markup language (HTML), it is understood that the concept is extendable to other types of markup languages.

To monitor performance of the media player 15, the performance monitor 16 needs to be aware of key events occurring within the media player 15. In the exemplary embodiment, the media player 15 supports different types of event handlers or event listeners. To receive event data, the performance monitor will subscribe to one or more of the event listeners as indicated at 24. When an event occurs, the event listener will report the event occurrence to the performance monitor as indicated at 25. For example, the media player may support an event handler pertaining to buffering of content by the media player. When the media player is buffering content for playback, the buffering event will be reported to the performance monitor. Exemplary events to be monitored for Adobe's Flash player are presented in the table below.

| Event | Description |
| --- | --- |
| Initialization | Triggered when the player call the plug-in |
| Metadata | Player has got media file header information. |
| AuthenticationNeeded | Player tries to access protected media content |
| Authenticating | Player is acquiring a license to play protected content |
| AuthenticationComplete | Content has been successfully authenticated. |
| AuthenticationError | Content authentication attempt failed. |
| DrmSystemUpdating | DRM system is currently being updated. |
| MediaError | During the playing media, any error will cause this event to occur |
| Buffering | Player is loading content for playback; position does not advance during this state. |
| Paused | Player does not advance its position. |
| Playing | Player is playing the content specified by its source property; its position advances forward. |
| Stopped | Player loaded media, but it is not playing or paused. Its position is 0 and does not advance. |

Exemplary events to be monitored for Microsoft's Silverlight player are also presented in the table below.

| Event | Description |
| --- | --- |
| Initialization | Triggered when the player call the monitor plug-in |
| AcquiringLicense | Only applicable when serving DRM-protected content; player is acquiring a license required to play DRM-protected content. |
| Buffering | Player is loading the media for playback; its position does not advance during this state. |
| Closed | Player contains no media; the player displays a transparent frame.(or logo frame) |
| Individualizing | Only applicable when serving DRM-protected content: The player is in the process of ensuring that proper individualization components (only applicable when playing DRM-protected content) are installed on the user's computer. |
| Opening | Player is validating and attempting to open the Uniform Resource Identifier (URI). |
| Opened | When the media stream has been validated and opened, and the file headers have been read. |
| Paused | Player does not advance its position. |
| Playing | Player is playing the media specified by its source property; its position advances forward. |
| Stopped | Player loaded media, but it is not playing or paused. Its position is 0 and does not advance. |
| MediaError | During the playing media, any error will cause this event occurred |

It is envisioned that other types of events may prove to be useful and thus fall within the scope of this disclosure. Likewise, it is understood that the principles described herein are extendable to events supported by other types of media players. In this way, the performance monitor learns of events occurring inside the media player and otherwise not visible to components residing on the client computing device.

Upon receiving event data from the media player, the performance monitor can store the event data locally and periodically send the event data over a data network to a backend processor remote from the client computing device. In this case, performance metrics for the media player will be computed from the event data by the backend processor. Alternatively, performance monitor can compute the performance metrics from the event data before sending the performance metrics to the backend processor. In either case, the performance monitor communicates either the event data or the performance metrics over a data network at 26 to a backend processor 17 residing on a server remote from the client computing device.

Figure 4A:
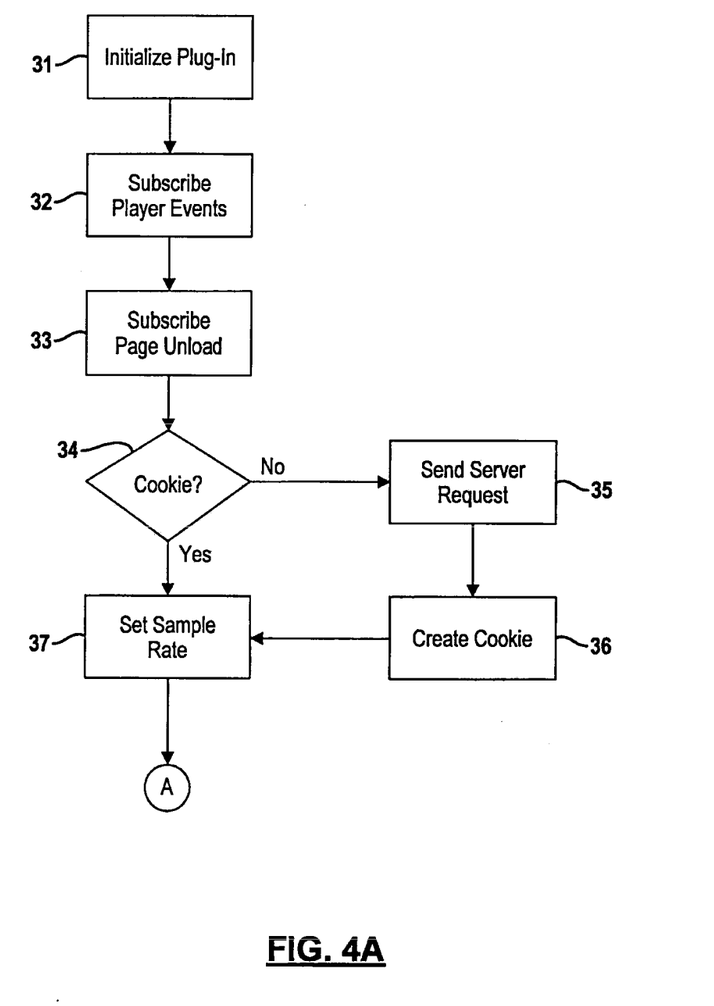
FIGS. 4A and 4B are flowcharts depicting an exemplary embodiment of a performance monitor.
Figure 4B:
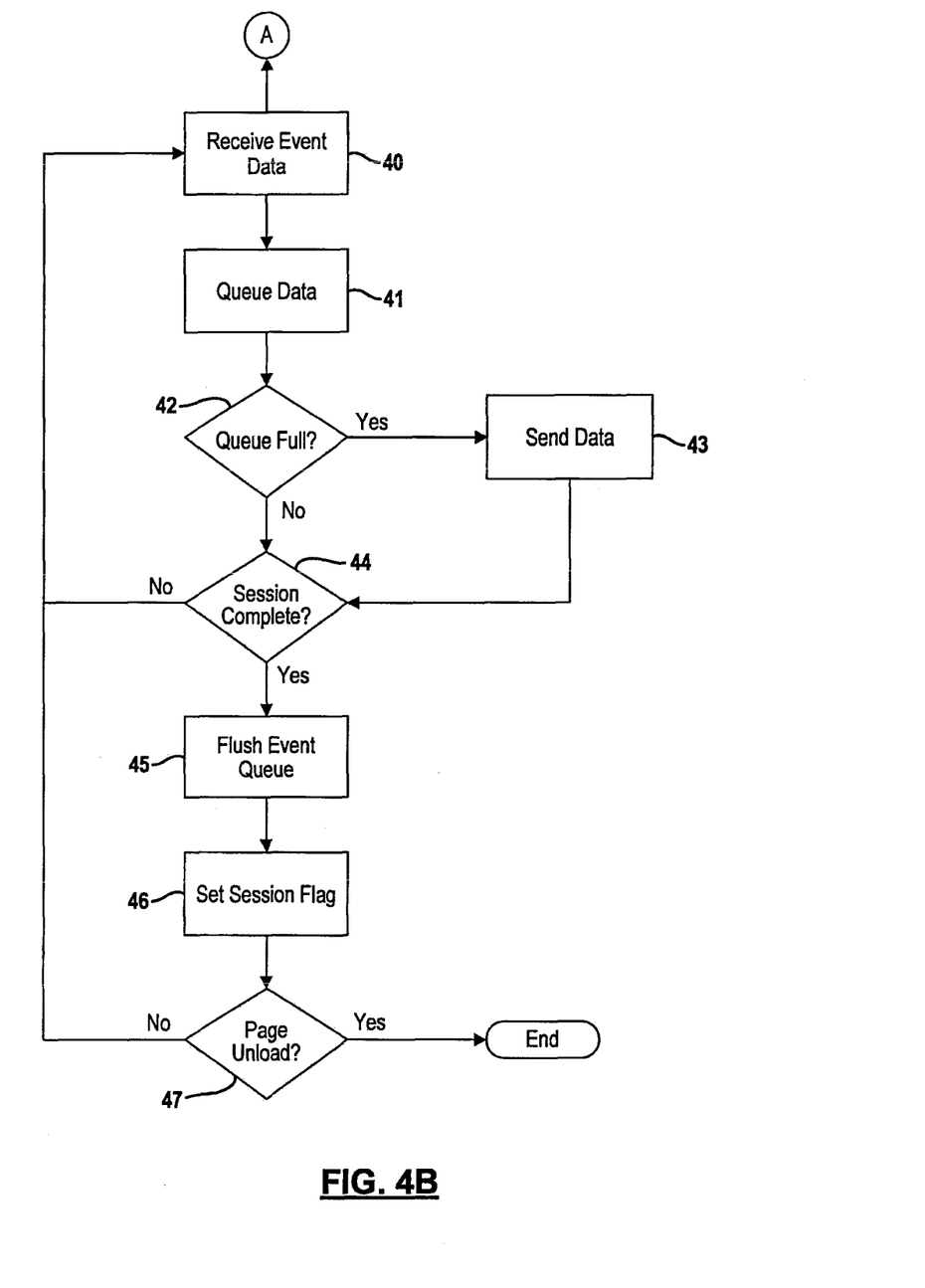

Operation of the performance monitor 16 is further described in relation to the flowchart depicted in FIGS. 4A and 4B. The performance monitor is loaded by the media player as noted above. In doing so, the media player 15 will initialize at 31 various parameters of the performance monitor 16 such as an account identifier, a group identifier, a web page identifier, etc. These parameter values are typically specified in the html document of the web page that launched the media player.

Once initialized, the performance monitor 16 will subscribe to at least two event handlers. To receive event data from the media player 15, the performance monitor 16 will first subscribe at 32 to one or more of the event listeners exposed by the media player. Details regarding the different types of events are further described below. In addition, the performance monitor 16 will subscribe at 33 to the page unload event handler. This enables the performance monitor 16 to determine when an end user has left the web page and thereafter terminate its processing.

Next, the performance monitor 16 will determine a rate at which the monitor will sample and/or report event data to a backend processor 17. A check is made at 34 for a cookie or some other type of local data store associated with the performance monitor. If a cookie resides on the client computing device, the sample rate is obtained from the cookie. The cookie may also used to store other types on data, including a unique identifier assigned by the backend processor 17 to the client computing device. The unique identifier may be generated in various ways and used by the backend processor for reporting purposes.

When the cookie is absent or expired, the performance monitor will send a request at 35 for the sample rate to the backend processor. In an exemplary embodiment, the request may be communicated using an HTTP GET method although other means are contemplated. The backend processor will in turn respond to the request with the sample rate as well as other information. Upon receipt of the response, the performance monitor will create a cookie at 36 on the client computing device or otherwise update the local data store. In either case, the sample rate is used to regulate the monitoring processing in the manner further described below.

The performance monitor is now configured to receive event data from the media player. Event data is received at 40 by the performance monitor. Rather than report each event to the backend processor, events are collected in a queue and periodically sent to the backend processor. Thus, each event is placed in a send queue as indicated at 41. For each new event, the queue is checked at 42. For example, does the number of events in the queue exceed a configurable threshold (e.g., 15 events). When the queue is full, the performance monitor will bundle the event data in the send queue as a package and send the data at 43 to the backend processor. In addition to the event data, the data package may include the unique identifier assigned to the client computing device by the backend processor 17. The data package may further include identifiers for the type of web browser (e.g., Safari, Chrome, etc.), the type of media player, the type of operating system and other parameters associated with the execution environment of the client computing device. In an exemplary embodiment, the package, including event data, is sent by the performance monitor 16 using an HTTP SEND method although other means are contemplated. The send queue is emptied once the data package has been successfully sent. Whether the queue is full or not, a determination is made as to whether the media session is complete at 44 before processing the next event. Different event types signify the end of a session, such as a stop event or a media error event.

Event data continues to be processed by the performance monitor until the media session is complete. Once the media session is complete, the performance monitor will send any remaining event data in the queue to the back processor and empty the queue as indicated at 45.

Rather than report data for each media session, the performance monitor can be configured to process or report on a subset of media sessions handled by the media player. The sample rate dictates the percentage of media sessions processed by the performance monitor. For a sample rate set to 100%, the performance monitor would report event data for each media session handled by the media player. When the sample rate is set to 25%, the performance monitor would report event data for one or every four media sessions handled by the media player. Whether to process a given media session is determined at step 46. In an exemplary embodiment, the performance monitor will maintain a count of the number of media sessions. A determination as to whether to process a given media session can then be made from the sample rate and the session count. A Boolean flag can be set to indicate whether the next media session is to be processed. For example, when the sample rate is 50%, the flag is set to true when the session count is an even number and set to false when the session count is an odd number. When the sample rate is 25%, the flag is set to true for event fourth session. Before event data is sent to the backend processor, the flag is checked (e.g., in steps 43 and 45). Event data is sent when the flag is set to true and not sent when the flag is set to false. Other ways for sampling a subset of media sessions are also contemplated by this disclosure.

Media sessions handled by the media player continue to be processed until the web page that launched the media player is closed. Once the web page is closed, the performance monitor receives an event indicating the web page was unloaded and terminates processing as indicated at 47. It is to be understood that only the relevant steps of the methodology are discussed in relation to FIGS. 3A and 3B, but that other software-implemented instructions may be needed to control and manage the overall operation of the performance monitor.

One aspect of this disclosure is determining which performance metrics are pertinent to a media player launched by a web browser. Some of the most pertinent performance metrics are further described below in relation to FIG. 5. Start-up time is a measure of how long it takes for a stream to start playing. In one embodiment, the start-up time is determined by subtracting the timestamp for the plug-in initialization event from the timestamp for the first play event. This metric is important because it reflects how long an end user of the media player has to wait before seeing the media content.

Figure 5:
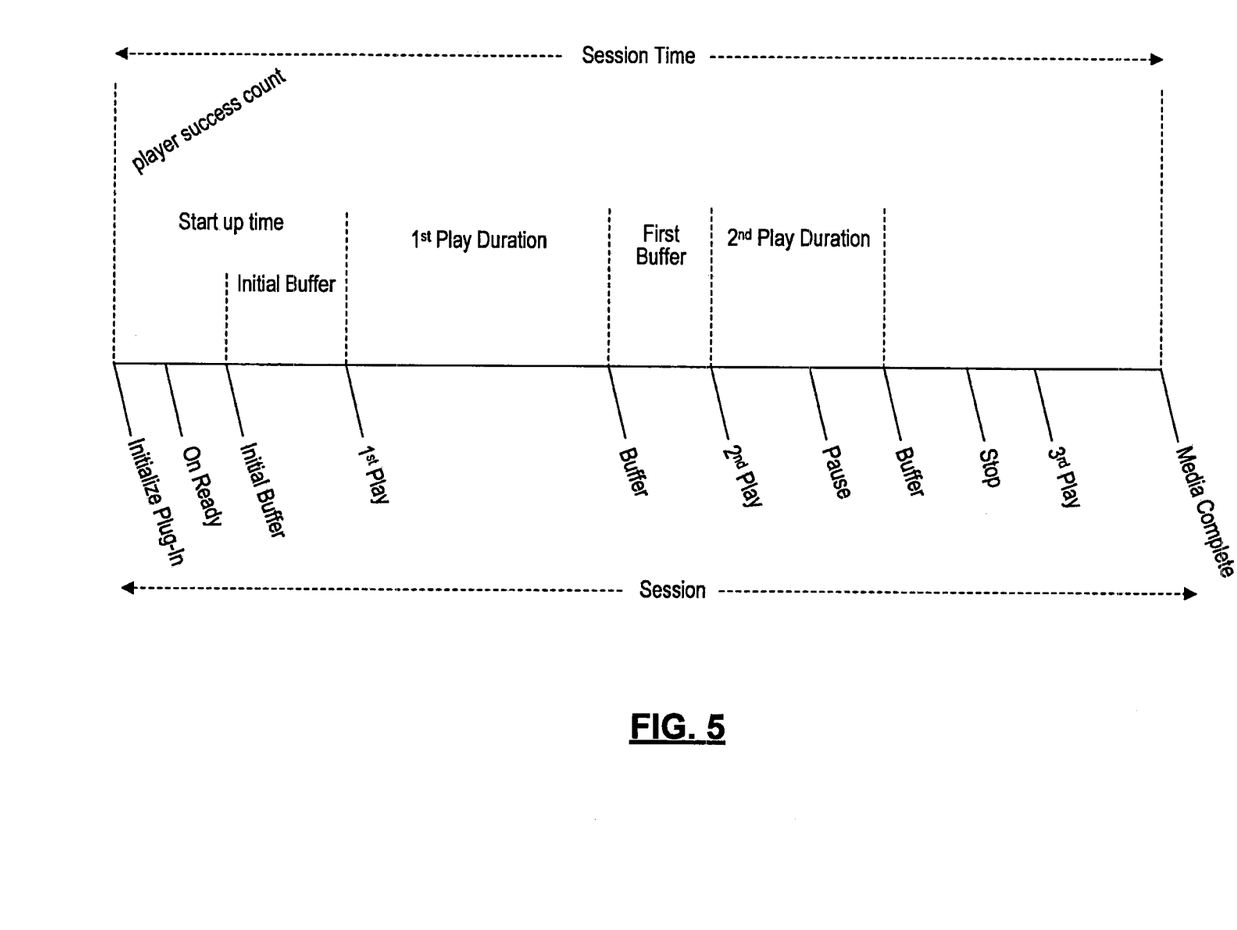
FIG. 5 is a diagram illustrating various performance metrics pertinent to a media player.

Start to stop time (session time) is a measure of how long it takes for a stream to play until the session ends, including buffering. In one embodiment, the start to stop time is determined as the time difference between the plug-in initialization event and the stop event. This metrics measures how long each session lasts and may also be computed using other events that terminate a session.

Session error is a measure of the number of errors that occurred while the media player was loaded. In one embodiment, the performance monitor maintains a count of error events that occurred. This metric provides an indication of the stability of the data link between the content source and the media player.

Initial buffer time is a measure of the time elapsed during the first buffer event. More specifically, the time elapsed from the point at which a URL has been resolve, the connection made and any metadata downloaded to the point at which the buffer is filled and playback begins. In one embodiment, the initial buffer time is determined as the time difference between the first buffer event and the first play event.

Average rebuffer time is a measure of average time spent buffering content and thus waiting by the end user. The average rebuffer time is determined by summing all of the buffering time (i.e. time between a buffer event and the next play event) and dividing this sum by a count of buffer events. This metric may be computed inclusive or exclusive of the initial buffer time with the buffer count adjusted accordingly. Furthermore, this metric may be computed for a given session or across multiple sessions.

Rebuffer ratio is a measure of the total time spent waiting during buffering as a percentage of the total session time. The ratio is determined by summing the total buffer time and then dividing the total buffer time by the session time. Alternatively, the ratio may exclude start up time, such that total buffer time is divided by the sum of the total play time and the total buffer time. Again, this metric may be computed for a given session or across multiple sessions.

Average play time is a measure of an uninterrupted playback session between interruptions during playback of media content. In one embodiment, the average play time is determined by summing of all play time during a session (i.e., total play time) and dividing the total play time by the play count. Since interruptions may be caused by numerous types of events, including user-initiated events, the metric may be computed inclusive or exclusive of the user-initiated events.

Session success rate is a measure of session started that completed successfully. In one embodiment, a session count is maintained for the number of sessions initialized and a success count is maintained for the number of these initiated sessions completed successfully (i.e., without error). The session success rate is computed by dividing success count by the session count.

Performance metrics such as those described above can be derived by the performance monitor before sending to the backend processor or can be derived from event data sent by the performance monitor to the backend processor. While a few key performance metrics have been described above, it is readily understood that other types of performance metrics can be derived from the event data captured by the performance monitor and thus fall within the broader aspects of this disclosure.

Performance metrics are accumulated by the backend processor for subsequent analysis and reporting. For instance, performance metrics may be accumulated over time from a particular client computing device. Such performance metrics may then be subsequently analyzed to evaluate performance media players launched on that particular client computing device. For example, the backend processor may compile reports as to how the media players performed at different times of the day. In another example, since one web site may reference Adobe's Flash player while another web site may reference Microsoft's Silverlight player, reports may be compiled comparing how each of these two different media players performed on the this particular client computing device. Other types of reports pertaining to a particular client computing device are also contemplated.

Moreover, performance metrics are accumulated across many different client computing devices. Likewise, these accumulated performance metrics can be analyzed by the backend processor. As a result, different types of reports can be generated regarding the performance of media players across the network. For example, performance metrics can be reported in relation to a particular geographic area, such as city or country. Performance metrics can be reported in relation to particular aspects of the computing environment, such as metrics for different types of web browser or operating systems. In another example, performance metrics can be reported according to the Internet service provider and/or the type of network connection between the media player and its data source. Most importantly, performance metrics are aggregated for customers associated with a particular web site or series of web sites. In this way, web site owners can track the performance experienced by users of media players integrated into their web sites.

Figure 6:
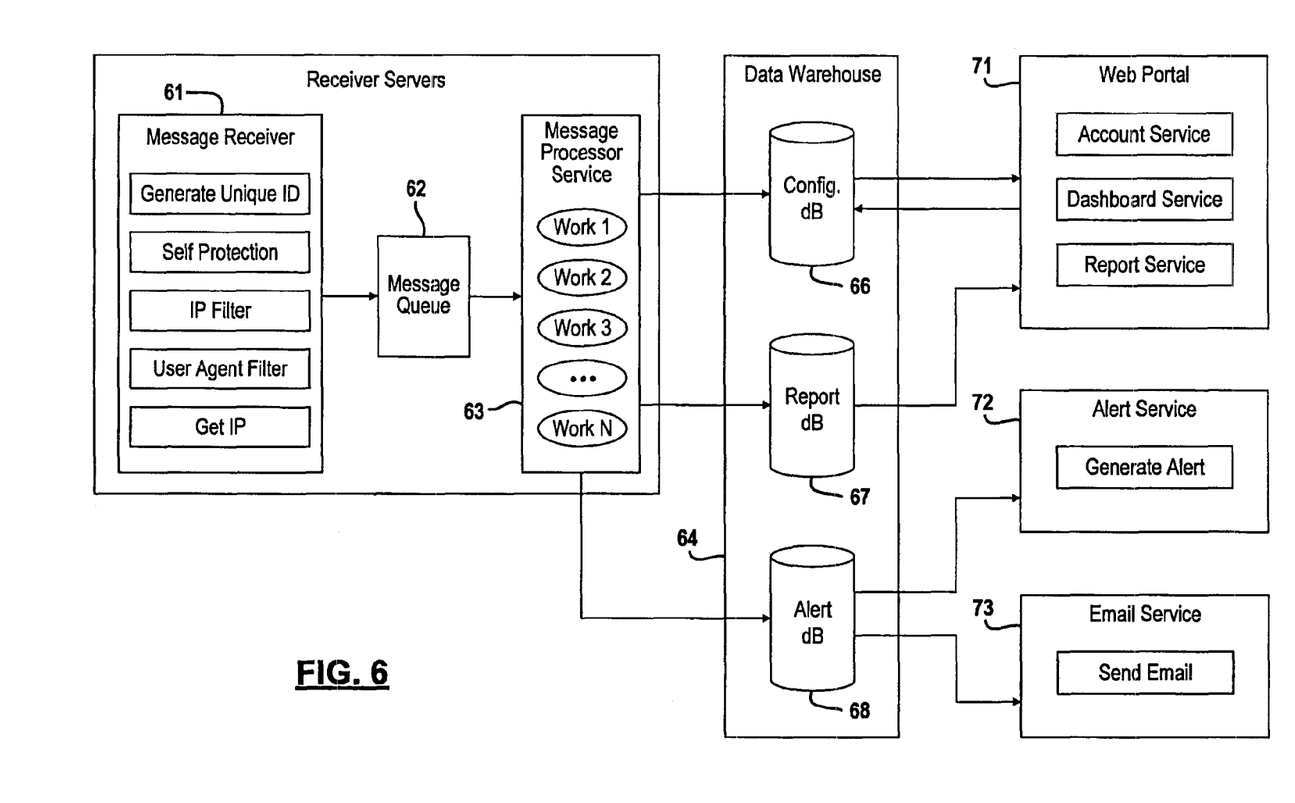
FIG. 6 is a diagram depicting an exemplary architecture for a backend processor for performance data captured by web browsers.

FIG. 6 illustrates an exemplary architecture for a backend processor 60. The backend processor 60 may be comprised generally of a message receiver 61, a message queue 62, a message processor service 63, and a data warehouse 64. Each of these components is further described below. It is readily understood that these components may be implemented on a single server computer or distributed across multiple server computers.

The message receiver 61 is responsible for interfacing with the performance monitor. More specifically, the message receiver 61 is configured to receive requests (e.g., HTTP GET requests) and respond accordingly to the requests. For example, the message receiver 61 will respond to a request for a sample rate from a performance monitor. Additionally, the message receiver 61 will receive messages sent by the performance monitor and place the messages in the message queue 62 for asynchronous processing. When a message is inserted into the queue, a timestamp is added to the message body. The message receiver may perform other tasks including generating a unique identifier for new requestors, filtering out messages from addresses in a blacklist as well as implement other protection mechanisms. In an exemplary embodiment, the message receiver 61 is implemented as an application running in the Internet Information Services (IIS).

The message processor service 63 is responsible for processing incoming messages placed in the message queue 62. In particular, the message processor service 63 is configured to parse the messages and place the data contained therein, including event data, into more persistent data stores or databases residing in data warehouse 64. To do so, the message processor service 63 will classify data, including identifying associated customer and mapping IP address to geographic locations. Data may be stored in an aggregate manner or partitioned amongst different data stores based on traffic type (e.g., mobile vs. non-mobile), customer type, etc. In an exemplary embodiment, the data warehouse 64 includes a configuration database 66, a reporting database 67 and an alert database 68. The message processor service 63 will also analyze the data gathered by the performance monitor. For example, message processor service 63 may create alert events based on customer settings. In an exemplary embodiment, the message processor service may be implemented as a Windows service.

The backend processor 60 may further support different ancillary services, including a web portal 71, an alert service 72 and an email service 73. The web portal 71 may be used by system administrators to input, modify and maintain configuration parameters stored in the configuration database. Exemplary configuration parameters may include a global default value for the sample rate. The web portal 71 may also offer dashboard services as well as other reporting functions for data contained in the data warehouse 65. The alert service 72 is responsible for generating alerts and the email service 73 is responsible for sending alert notifications to subscribing customers. Each of these services may also be implemented as a Windows service.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A computer-implemented system for monitoring performance of a media player launched by a web browser residing on a client computing device, comprising:
a document that defines a web page and is formatted in accordance with a markup language;
a media player referenced by the document and implemented as a plug-in to a web browser;
a processor executing a performance monitor implemented as a plug-in to the media player and that operates to subscribe to event listener objects exposed by the media player and receives event data that is reported by the event listener objects during rendering of content by the media player, including wherein the performance monitor further subscribes to a page unload event handler and, in response to an unload page event, terminates processing of the performance monitor, the document includes a tag for the media player and the tag for the media player is embedded with a uniform resource locator for the performance monitor; and
a web browser configured to receive the document over a data network from a server and operable to launch the media player using the tag for the media player in the document, wherein the media player in turn operates to launch the performance monitor using the uniform resource locator embedded in the tag, wherein the performance monitor is computer-executable instructions residing in a non-transitory, tangible computer readable storage medium of the client computing device.

2. The system of claim 1 wherein the document is formatted in accordance with hypertext markup language.

3. The system of claim 1 wherein the performance monitor is implemented as a client-side script written in a scripting language.

4. The system of claim 1 wherein the media player depends upon computing services provided by the web browser.

5. The system of claim 4 wherein the performance monitor depends upon computing services provided by the media player.

6. The system of claim 1 wherein the performance monitor operates to store the event data in a data store residing on the client computing device and send the event data over the data network.

7. The system of claim 6 further comprises a backend processor in data communication with the performance monitor over the data network, wherein the backend processor is configured to receive the event data sent by the performance monitor and operates to derive performance metrics from the event data.

8. The system of claim 7 wherein the performance monitor receives an event indicating buffering of content by the media player and the backend processor derives one or more performance metrics pertaining to buffering of content from the event.

9. A computer-implemented method for monitoring performance of a media player launched as a plug-in to a web browser residing on a client computing device, comprising:
launching, by a web browser, a media player while rendering a web page, where a document formatted in accordance with a markup language defines the web page and includes a tag for the media player;
launching, by the media player, a performance monitor as a plug-in to the media player using the tag, where the tag is embedded with a uniform resource locator for the performance monitor;
subscribing, by the performance monitor, to an event listener object, where the event listener object is supported by the media player;
receiving, by the performance monitor, event data occurring during rendering of content by the media player and that is reported by the event listener object;
determining performance metrics for the media player from the event data;
communicating at least one of the event data and the performance metrics from the performance monitor over a data network to a server remote from the client computing device; and
subscribing, by the performance monitor, to a page unload event handler and, in response to an unload page event for the web page, terminate processing.

10. The method of claim 9 further comprises receiving event data pertaining to buffering of content by the media player.

11. The method of claim 9 further comprises determining performance metrics for the media player from the event data by the performance monitor before communicating the performance metrics to the server.

12. The method of claim 9 further comprises storing the event data in a queue associated with the performance monitor, periodically sending the event data to the server and determining performance metrics for the media player from the event data at the server.

13. The method of claim 9 further comprises communicating the performance metric in accordance with a hypertext transfer protocol.

14. The method of claim 9 further comprises requesting a unique identifier for the client computing device from the server by the performance monitor and associating the unique identifier with the performance metrics.

15. The method of claim 9 further comprises receiving an unload page event at the performance monitor and communicating at least one of the event data and the performance metrics to the server in response thereto.

16. The method of claim 9 further comprises receiving event data at the performance monitor during the rendering of content by the media player.

* * * * *